J. P. FULGHAM.
Seeding-Machine.

No. 208,588. Patented Oct. 1, 1878.

Attest
Chas. F. Gessert
John E. Jones

Inventor
Jesse P. Fulgham
By F. Millward
Attorney

UNITED STATES PATENT OFFICE.

JESSE P. FULGHAM, OF RICHMOND, INDIANA.

IMPROVEMENT IN SEEDING-MACHINES.

Specification forming part of Letters Patent No. 208,588, dated October 1, 1878; application filed February 19, 1878.

*To all whom it may concern:*

Be it known that I, JESSE P. FULGHAM, of Richmond, Wayne county, State of Indiana, have invented an Improvement in Seeding-Machines, of which the following is a specification:

My invention relates to that class of seed-drills in which a series of seed-cups are arranged to receive grain from the hopper, each cup being provided with a toothed feed-wheel rotated by a central shaft, and adapted to move in the direction of the length of the hopper into and out of its cup more or less, to regulate the quantity of seed delivered to the acre, each cup also having a sleeve adapted to slide (only) in company with the revolving wheel when the latter is adjusted, the sleeve being designed to prevent any grain from passing through the cup except such as is carried out by the teeth of the wheel.

It has been customary to adjust the wheel and sleeve by confining them between two pins inserted in the driving-shaft, and giving said shaft a longitudinal movement, the pins causing the wheel and sleeve to accompany the shaft.

My invention is, in the main, designed to apply to machines in which the shaft has the usual rotary motion, but no longitudinal movement; and it consists, in the first part, in so coupling the wheel and sleeve together that, while the wheel is permitted to slide freely on the shaft and to rotate freely with the shaft, it is caused to follow any sliding movement which may be given to the sleeve, for the purpose of regulating the seed-delivery.

My invention consists, in the second part, in connecting all the sleeves of the cups to a longitudinally-moving adjusting-bar, in such a manner that while the movement of the bar will cause the simultaneous movement of all the sleeves and wheels each sleeve can be adjusted on the bar independently of the others, so that, if any wheel is found to be delivering more or less grain than the predetermined quantity per acre for each, the sleeve of that wheel can be adjusted differently on the bar, and the wheel made to deliver the prescribed quantity.

My invention consists, in the third part, in combination, with the seed-wheel, of a sleeve sufficient in diameter to form its cut-off on the upper side of the cup without the use of a wing for that purpose, and which has a V-shaped groove or gutter formed between itself and the wheel, for the purpose of collecting and delivering the grain to the ends of the teeth of the wheel. This part of my invention is applicable to drills having wheels moved longitudinally by the shaft.

Figure 1:
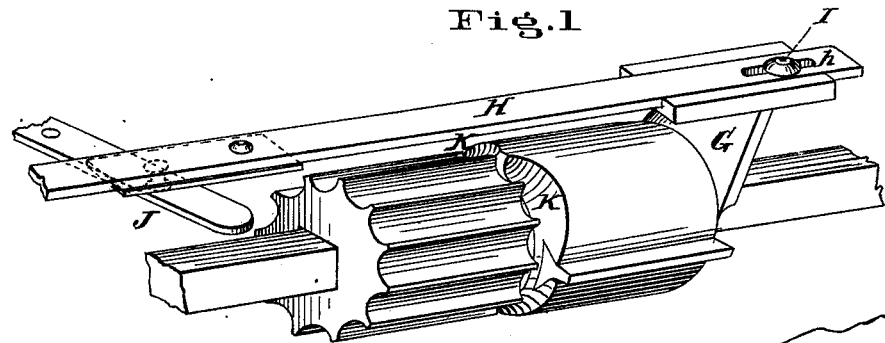
Figure 3:
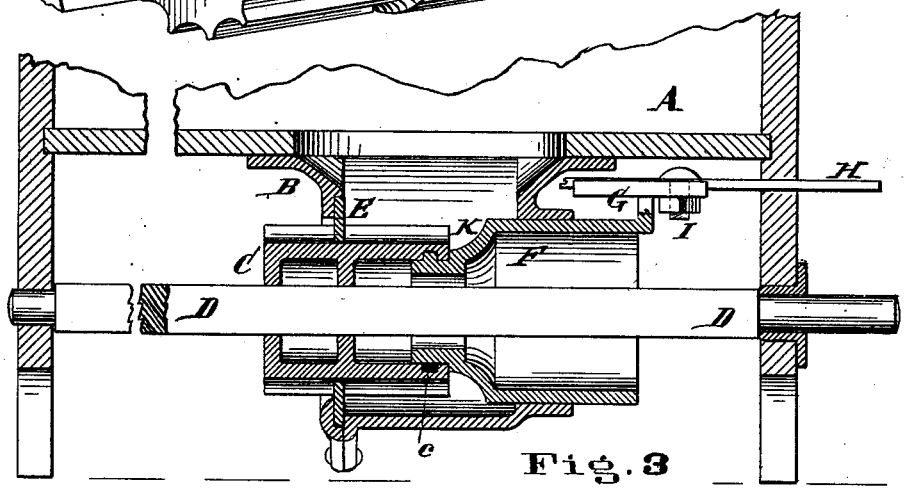
Figure 2:
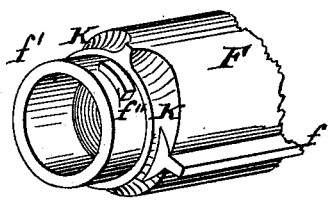
Figure 4:
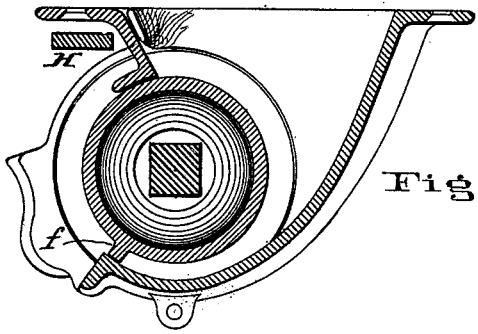

In the accompanying drawings, Figure 1 is a skeleton perspective view of the wheel and sleeve and its actuating-bar. Fig. 2 is a perspective view of the inside end of the sleeve, showing the projection thereon. Fig. 3 is a longitudinal section through the seed-cup, wheel, and sleeve. Fig. 4 is a cross-section through the seed-cup, showing the groove or gutter between the sleeve and wheel.

A is the seed-box. To better illustrate the invention, only one seed-cup, B, is shown. C is the corrugated or toothed feed-wheel. It is rotated by the square or angular shaft D, and carries with it, as usual, a thin washer, E, corresponding with the shape of the teeth, and whose purpose is to prevent escape of grain. F is the sleeve. It has a wing, $f$, at the bottom, fitting in a notch in the case to prevent its rotation with the wheel. The wheel C has a groove, $c$, formed in it interiorly, and the sleeve F has a small cylindrical end, $f'$, fitting into the wheel, and a tooth or projection, $f''$, to engage in the groove of the wheel, as shown. This connection enables the wheel to revolve freely with the shaft, and enables the sleeve to adjust the wheel, and consequently the delivery of the grain. Each sleeve has secured to it or formed upon it a bracket, G, which is secured to the adjusting-bar H. A slot, $h$, is made either in the bracket or bar, through which the securing-bolt I passes, to give each sleeve an independent adjustment, as stated.

The bar H may be moved by a lever, J, and it may carry an index-finger to pass along a graduated scale on the seed-box, to indicate the number of bushels sown to the acre.

The sleeve F is equal to or larger than the wheel in diameter, so that on the upper side it may, without the use of a cut-off wing, cut off the grain from passing between it and the case.

A groove, K, is formed between the sleeve and its wheel, for the purpose of gathering the seed and delivering to the ends of the teeth. This groove may be formed by beveling off the sleeve, as shown, or by beveling off the wheel, or both.

I claim—

1. In a force-feed for grain-drills, the combination, substantially as specified, of the seed-cup, rotary seed-wheel, the washer thereof, and the separate cut-off sleeve, which is adapted to slide endwise only, but is coupled to the seed-wheel.

2. In a force-feed grain-drill, the combination, substantially as specified, of the sliding but non-rotating sleeves for adjusting the seed-wheels, the bar for simultaneously moving all said sleeves, and adjustable connections between said bar and each of the sleeves.

3. In combination with the wheel C, the sliding but non-rotating sleeve F, constructed of large diameter, so as to form its own cut-off, and having a seed-collecting groove, K, formed between it and the wheel, to deliver seed to the ends of the teeth thereof.

In testimony of which invention I hereunto set my hand.

JESSE P. FULGHAM.

Witnesses:
JOHN E. JONES,
DAVID C. JONES.